United States Patent
Abrishamkar et al.

(10) Patent No.: US 7,986,728 B2
(45) Date of Patent: *Jul. 26, 2011

(54) EQUALIZER WITH COMBINED CCK ENCODING-DECODING IN FEEDBACK FILTERING OF DECISION FEEDBACK EQUALIZER

(75) Inventors: Farrokh Abrishamkar, San Diego, CA (US); John E. Smee, San Diego, CA (US); Seguei A. Glazko, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 851 days.

This patent is subject to a terminal disclaimer.

(21) Appl. No.: 11/951,742

(22) Filed: Dec. 6, 2007

(65) Prior Publication Data

US 2008/0075161 A1    Mar. 27, 2008

Related U.S. Application Data

(63) Continuation of application No. 10/447,485, filed on May 28, 2003, now Pat. No. 7,324,590.

(51) Int. Cl.
*H04L 27/10* (2006.01)
*H04L 27/18* (2006.01)

(52) U.S. Cl. .................................................. 375/233

(58) Field of Classification Search .............. 375/142, 375/143, 148, 149, 150, 229, 231, 232, 233, 375/234, 285, 341, 343, 344, 346, 348; 714/699, 714/704, 752, 755, 758, 786, 792, 796, 801

See application file for complete search history.

(56) References Cited

U.S. PATENT DOCUMENTS

| | | | |
|---|---|---|---|
| 6,144,697 A * | 11/2000 | Gelfand et al. | ............... 375/233 |
| 6,678,310 B1 | 1/2004 | Andren | |
| 6,754,294 B1 | 6/2004 | Adireddy | |
| 6,882,692 B2 * | 4/2005 | Somayazulu | ............... 375/343 |

(Continued)

FOREIGN PATENT DOCUMENTS

WO    0072540    11/2000

OTHER PUBLICATIONS

International Search Report—PCT/US04/017161—International Search Authority—European Patent Office—Nov. 10, 2004.

(Continued)

*Primary Examiner* — Dac V Ha
*Assistant Examiner* — Syed Haider
(74) *Attorney, Agent, or Firm* — Peng Zhu; James K. O'Hare

(57) ABSTRACT

A decision feedback equalizer includes a chip estimate buffer that forms chip estimates into a vector. A CCK decoder decodes the vector of chip estimates, and a CCK encoder, connected with the CCK decoder, re-encodes the vector of chip estimates into a valid CCK code word. At the same time, a chip slicer provides direct sliced chips from the chip estimates. An update module then forms a hybrid vector from the valid CCK code-word and the direct sliced chips for input to the feedback filter of the decision feedback equalizer. The hybrid feedback filter input vector reflects the CCK coding gain of its re-encoded portion thereby reducing the estimated chip error rate to improve the performance of the decision feedback equalizer.

12 Claims, 5 Drawing Sheets

U.S. PATENT DOCUMENTS

| | | | |
|---|---|---|---|
| 7,017,104 B1* | 3/2006 | Chen et al. | 714/796 |
| 7,027,538 B2 | 4/2006 | Ghosh | |
| 7,130,343 B2 | 10/2006 | Schmidt | |
| 7,263,119 B1* | 8/2007 | Hsu et al. | 375/150 |
| 7,298,798 B1* | 11/2007 | Chao et al. | 375/341 |
| 7,342,952 B2* | 3/2008 | Smee et al. | 375/148 |
| 2004/0101068 A1* | 5/2004 | Wang et al. | 375/324 |
| 2004/0125884 A1 | 7/2004 | Wei | |
| 2004/0165687 A1 | 8/2004 | Webster | |
| 2005/0254571 A1 | 11/2005 | Garg | |
| 2005/0254572 A1 | 11/2005 | Garg | |

OTHER PUBLICATIONS

IEEE Std 802 11b-1999. Part 11: Wireless LAN Medium Access Control (MAC) and Physical Layer Specification (PHY): Higher-Speed Physical Layer Extension in the 2.4 GHz Band.

Cheol-Hee Park et al.; "*Low-complexity channel estimator for high-rate personal area networks employing CCK modulation*": ICC 2001. 2001 IEEE International Conference on Communications. Conference Record Helsinky, Finland Jun. 2001, pp. 431-434.

\* cited by examiner

EQUALIZER WITH COMBINED CCK ENCODING-DECODING IN FEEDBACK FILTERING OF DECISION FEEDBACK EQUALIZER

CROSS-REFERENCE TO RELATED APPLICATION

This application is a continuation of U.S. patent application Ser. No. 10/447,485, filed on May 28, 2003, now pending, which is herein incorporated by reference in its entirety.

BACKGROUND

The present invention generally relates to wireless communication devices and, more particularly, to equalization for demodulation in wireless receivers for communication among wireless devices and access points in a local area network (LAN).

Wireless communication devices, for example, devices using radio frequency signal transmission, may be used for wireless LAN communication. Such wireless LAN communication devices may be described as stations or access points. Stations typically may be found in laptop computers, cell phones, portable modems, or personal digital assistants (PDAs), where they are used for communication with a wired LAN through an access point, which may be briefly described as a wireless transmitter/receiver connected into the wired LAN for interfacing the wired LAN to the wireless communication devices. Stations may also communicate with other stations in a peer-to-peer network, without the presence of an access point, described as operating in "ad-hoc" mode. Such wireless LAN communication devices may be manufactured according to a standard specification in order to secure advantages of standardization such as compatibility between systems made by different manufacturers. One such standard for wireless LAN communication networks, for example, is the 802.11b standard published by the Institute of Electrical and Electronics Engineers, Inc. (IEEE) and, in particular, IEEE Std 802.11b-1999, "Part 11:Wireless LAN Medium Access Control (MAC) and Physical Layer (PHY) specifications: Higher-Speed Physical Layer Extension in the 2.4 GHz Band", which is incorporated herein by reference.

A receiver may receive a data transmission for processing, such as according to the 802.11b standard, at rates 1, 2, 3, or 4. The data transmission may originate from a transmitter of another wireless communication device in a wireless LAN according to the 802.11b standard. The data transmission may undergo front-end processing in the receiver, which may include, for example, automatic gain control (AGC), offset control, time-tracking loop (TTL) processing, phase locked loop (PLL) processing, Barker despreading and respreading, estimation of channel impulse response (CIR), and channel matched filter (CMF) processing, as known in the art. Rate 1 and 2 data may undergo code matched filter (CMF) processing and differentially encoded quadrature phase shift keying (DEQPSK) demodulation, as known in the art. Rate 3 and 4 data which, according to the 802.11b standard, is complementary code keying (CCK) data, requires equalization and so may be passed to an equalizer after front-end processing and then to a demodulator for CCK DEQPSK demodulation.

The equalizer may be a decision feedback equalizer (DFE) which typically incorporates two finite impulse response (FIR) filters, one a feedforward filter (FFF) and the other a feedback filter (FBF). The decision feedback equalizer may be used, for example, to suppress intersymbol interference (ISI) caused by dispersive propagation channels. The feedforward filter may operate directly on the data and the feedback filter may operate on previously detected data symbols. The decision feedback equalizer generally outperforms linear equalizers, but degradation in DFE performance, with respect, for example, to suppressing ISI, may occur when incorrectly detected symbols are fed through the feedback filter. Decision errors in feedback to the equalizer may tend to cause yet more incorrect decisions so that decision errors may occur in bursts with a corresponding increase in the average probability of bit and symbol error, as known in the art.

As can be seen, there is a need for using the CCK encoding of symbols in the data supplied to a decision feedback equalizer to reduce decision errors in the decision feedback equalizer. There is also a need for a decision feedback equalizer that takes advantage of the CCK encoding of data to improve the performance of the decision feedback equalizer and DEQPSK demodulation.

SUMMARY

In an embodiment, a decision feedback equalizer includes a chip estimate buffer that forms chip estimates into a vector, a CCK decoder that decodes the vector of chip estimates, and a CCK encoder connected with the CCK decoder, so that the CCK encoder re-encodes the vector of chip estimates into a valid CCK code word. At the same time, a chip slicer provides direct sliced chips from the chip estimates. An update module then forms a hybrid vector from the valid CCK code-word and the direct sliced chips for input to a feedback filter of the decision feedback equalizer.

In another embodiment, a decision feedback equalizer includes a feedforward filter having an output; a feedback filter having an output; and a sum module that combines the feedforward filter output and the feedback filter output to produce chip estimates. A chip estimate buffer forms the chip estimates into a vector. A CCK decoder decodes the vector of chip estimates and a CCK encoder, connected with the CCK decoder, re-encodes the vector of chip estimates into a valid CCK code word. At the same time, a chip slicer provides a sequence of direct sliced chips from the chip estimates. An update module forms a hybrid vector from the valid CCK code-word and the sequence of direct sliced chips, and provides the hybrid vector as input vector to the feedback filter.

In an embodiment, a decision feedback equalizer includes means for forming a chip estimates into a vector of chip estimates; means for re-encoding the vector of chip estimates into a CCK code-word; means for slicing the chip estimates to provide a sequence of direct sliced chips; and means for forming a hybrid vector from the CCK code-word and the sequence of direct sliced chips.

In still another aspect of the present invention, a wireless communication device includes a transmitter and a receiver. The receiver includes a front-end processing module that provides CCK data for demodulation; a demodulator that performs CCK DEQPSK demodulation of the CCK data; and a decision feedback equalizer.

The decision feedback equalizer includes a feedforward filter that receives the CCK data from the front-end processing module, and a feedback filter. A sum module receives a feedforward filter output and a feedback filter output, and produces chip estimates. A chip estimate buffer forms the chip estimates into a vector of chip estimates. A CCK decoder decodes the vector of chip estimates and a CCK encoder, connected with the CCK decoder, re-encodes the vector of chip estimates into a valid CCK code word. Meanwhile, a chip slicer provides a sequence of direct sliced chips from the chip estimates.

An update module forms a hybrid vector from the valid CCK code-word and the sequence of direct sliced chips, and provides the hybrid vector as input vector to the feedback filter. More specifically, the valid CCK code-word has form $[x_s'(1), x_s'(2), \ldots, x_s'(8)]$ and the sequence of direct sliced chips has form $[x_c'(1), x_c'(2), \ldots, x_c'(M)]$ where the input vector has length M. The update module forms the hybrid vector as $[x_s'(1), x_s'(2), \ldots, x_s'(8), x_c'(9), \ldots, x_c'(M)]$ when M>8; the update module forms the hybrid vector as $[x_s'(1), x_s'(2), \ldots, x_s'(8)]$ when M=8; and the update module forms the hybrid vector as $[x_s'(1), \ldots, x_s'(M)]$ when M<8.

In yet another embodiment, a wireless local area network includes a first wireless LAN communication device; and a second wireless LAN communication device in communication with the first wireless LAN communication device. The second wireless LAN communication device includes a receiver that receives a data transmission from the first wireless LAN communication device, processes the data transmission through a front-end processing module, and provides CCK data for demodulation; a demodulator that performs CCK DEQPSK demodulation of the CCK data; and a decision feedback equalizer.

The decision feedback equalizer includes a feedforward filter that receives the CCK data from the front-end processing module, a feedback filter, and a sum module that receives a feedforward filter output and a feedback filter output, and produces chip estimates. A chip estimate buffer forms the chip estimates into a vector. A CCK decoder decodes the vector of chip estimates and a CCK encoder, connected with the CCK decoder, re-encodes the vector of chip estimates into a valid CCK code word. Concurrently, a chip slicer provides a sequence of direct sliced chips from the chip estimates.

An update module forms a hybrid vector from the valid CCK code-word and the sequence of direct sliced chips, and provides the hybrid vector as input vector to the feedback filter. The hybrid vector is formed as: (1) chips of the valid CCK code-word followed in sequence by chips of the sequence of direct sliced chips, when a length of the valid CCK code-word is less than a length of the input vector; (2) chips of the valid CCK code-word, when the length of the valid CCK code-word equals the length of the input vector; or (3) chips of the valid CCK code-word up to the length of the input vector, when the length of the valid CCK code-word is greater than the length of the input vector.

In an embodiment, a method for decision feedback equalization includes steps of: (1) forming a plurality of chip estimates into a vector of chip estimates; (2) re-encoding the vector of chip estimates into a CCK code-word; (3) slicing the chip estimates to provide a sequence of direct sliced chips; and (4) forming a hybrid vector from the CCK code-word and the sequence of direct sliced chips.

These and other features and embodiments will become better understood with reference to the following drawings, description and claims.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, one embodiment of the present invention provides a decision feedback equalizer (DFE) for wireless local area network (LAN) communications that, in contrast to the prior art, takes advantage of the complementary code keying (CCK) encoding of data to improve performance of the decision feedback equalizer, for example, by reducing decision errors in the decision feedback equalizer. One example of wireless communication devices that could benefit from application of the present invention are wireless LAN communication devices, such as those found in 802.11b systems, that may typically be found in laptop computers, cell phones, portable modems, or personal digital assistants (PDAs), where they are used for communication with a wired LAN through an access point subject to the IEEE 802.11b standard. However, the present invention is not limited to the 802.11b standard.

An embodiment of the present invention may use a CCK encoder/decoder subsystem to modify an input to a DFE feedback filter (FBF). The input to the FBF may be considered to be a vector comprising a sequence of chip estimates. The top of the vector (i.e., the first or earliest in time, one of the sequence of chip estimates of the DFE feedback filter input vector (X)) may be replaced with the latest re-encoded CCK chip. The re-encoded CCK chip may be provided, for example, from CCK matched filter (MF) based data detection—i.e., data recovery or decoding—followed by re-encoding the data bits into a CCK code-word having 8 chips. Thus, the input vector X chips may be replaced 8 at a time as an example, with the replacement occurring at each eighth chip of the sequence, with CCK re-encoded chips. The combined CCK matched filter-based data detection followed by CCK data encoding into a corresponding CCK code-word reflects the CCK coding gain, which is superior to that of prior art, single stage, direct slicing of the chip estimates, i.e., providing the input vector X to the feedback filter one chip at a time as an estimated chip from the chip slicer.

"Coding gain" as referenced above may be described as the advantage in error reduction achieved by encoding the individual data bits into words rather than arbitrary strings of chips. Such coding gain is comparable to the ease of finding and correcting a spelling error in a word from the dictionary as opposed to an arbitrary string of letters, for which it is not possible to detect a spelling error in the arbitrary string because any string of individual letters is allowed.

Figure 1:
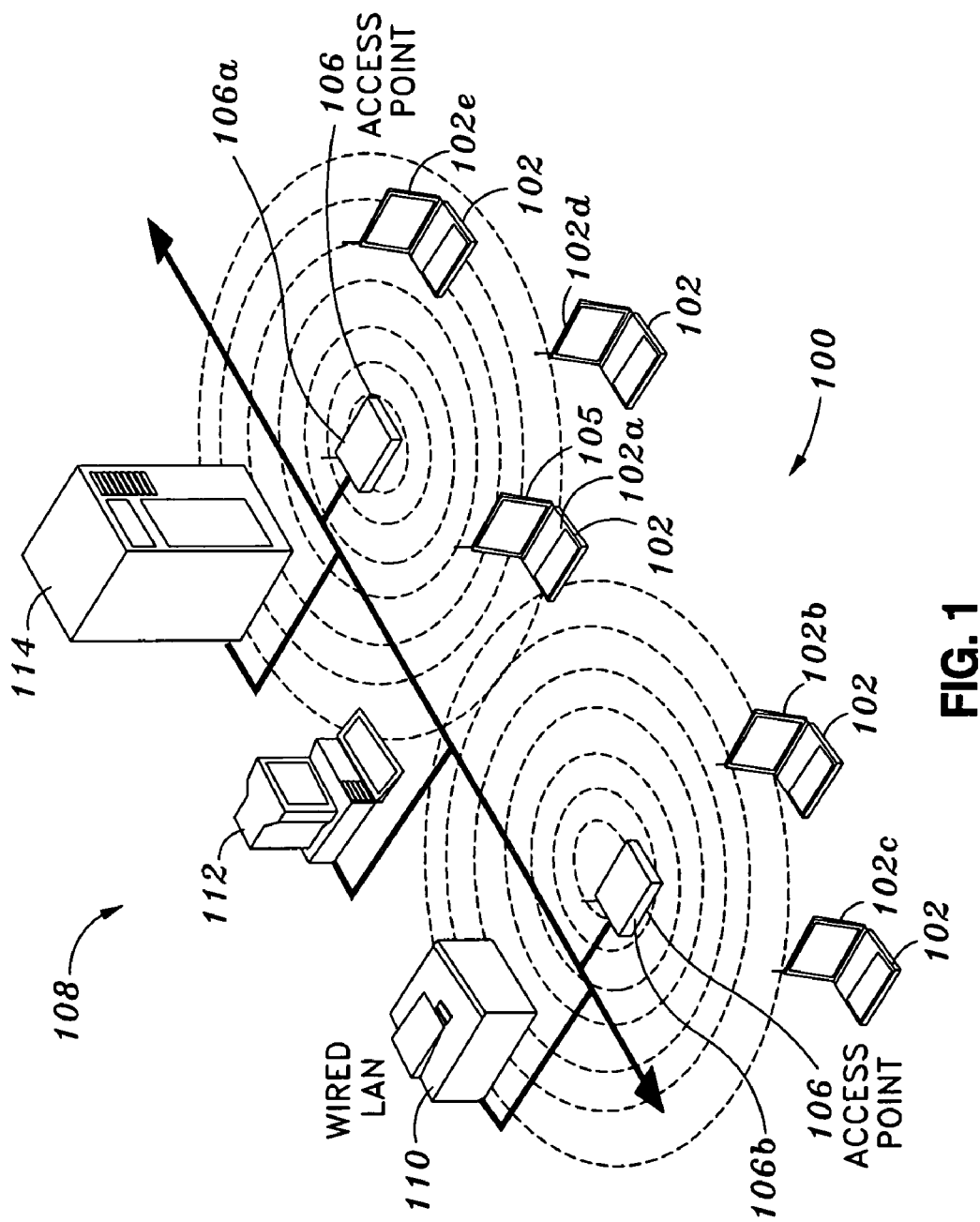
FIG. 1 is a diagram of a wireless LAN, having access to a wired LAN, in accordance with an embodiment of the present invention.

FIG. 1 illustrates an example of wireless local area network (LAN) communication devices that can employ the present invention and that may be used in laptop computers, cell phones, portable modems, or personal digital assistants (PDAs), where they are used for communication in a wireless LAN subject to the 802.11 standard (or some other standard), or for communication with a wired LAN through an access point subject to the 802.11 standard (or some other standard). FIG. 1 shows exemplary wireless LAN 100 comprising wireless communication devices 102a to 102e, where at least one of the wireless communication devices, for example, wireless communication device 102a, includes a receiver for processing data transmissions, according to the 802.11b standard, having a decision feedback equalizer according to an embodiment of the present invention as more fully described below. As illustrated in FIG. 1, communication device 102a may be included in a laptop computer 105, for example, providing wireless communication between laptop computer 105 and wireless LAN 100. One or more of the communication devices 102a to 102e may include a receiver having a decision feed back equalizer for processing data transmission, according to an embodiment of the present invention.

Wireless LAN 100 may operate in ad-hoc mode, as described above, so that, for example, wireless communication devices 102a to 102e operate in a peer-to-peer network, without the presence of an access point. Or, wireless LAN 100 may be connected through one or more access points 106 to a wired LAN 108. Access points 106a and 106b, for example, may provide wireless communication according to the 802.11 standard (or another standard) between wireless LAN 100 and wired LAN 108. Wired LAN 108 may be used, for example, to connect various devices, such as network printer 110, personal computer 112, and file server 114 as known in the art. Wired LAN 108 may also be used, for example, to connect the various devices, such as network printer 110, personal computer 112, and file server 114, to access points 106a and 106b and thereby connect the devices to wireless LAN 100. One or more of the access points, for example, access point 106a, may include a receiver for processing data transmission, according to the 802.11b standard, at rates 3 or 4 using a hybrid decision feedback equalizer according to an embodiment of the present invention.

Figure 2:
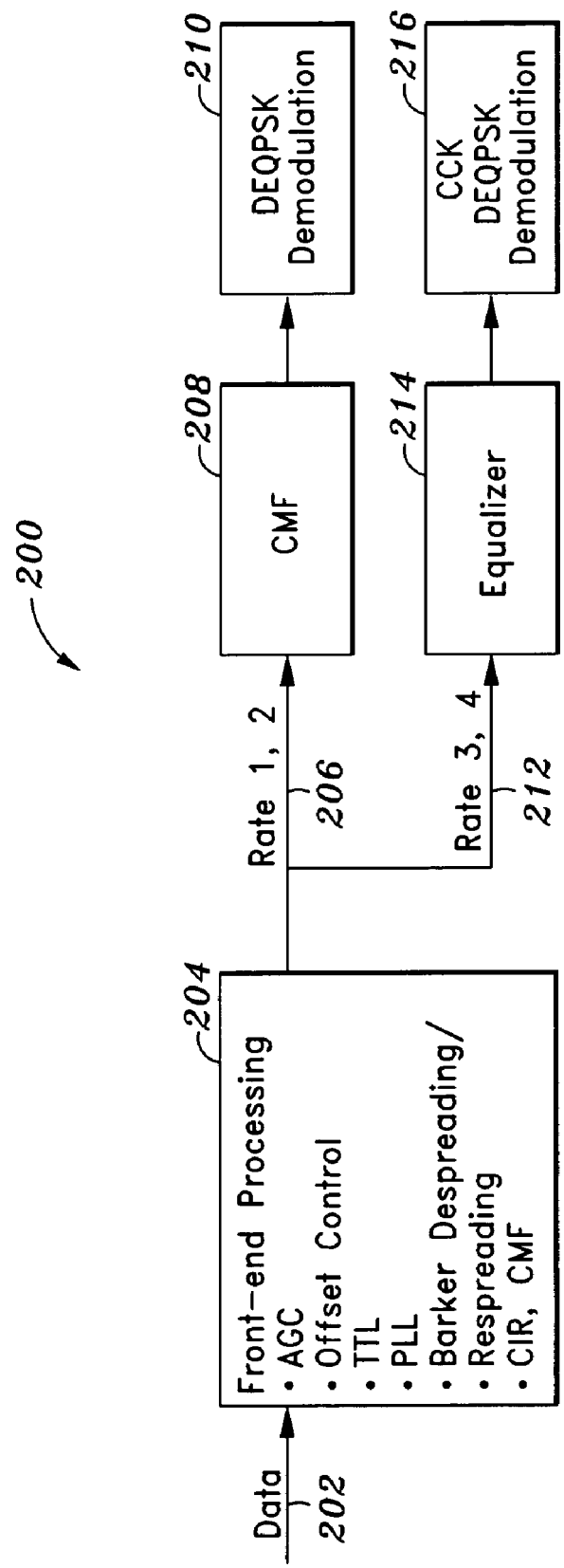
FIG. 2 is a block diagram of a receiver for a wireless communication device in accordance with an embodiment of the present invention.

FIG. 2 illustrates a receiver 200, having a decision feedback equalizer according to one embodiment, for processing data transmissions, according to the 802.11b standard, at rates 1, 2, 3, or 4. Receiver 200 may receive a data transmission 202, for example, originating from a transmitter of a wireless communication device—such as wireless communication device 102a, shown in FIG. 1—according to the 802.11b standard. Data transmission 202 may undergo front-end processing at front end processing module 204, which may include, for example, automatic gain control (AGC), offset control, time-tracking loop (TTL) processing, phase locked loop (PLL) processing, Barker despreading and respreading, estimation of channel impulse response (CIR), and channel matched filter (CMF) processing, as known in the art. Rate 1 and 2 data 206 may then be passed to block 208 for code matched filter (CMF) processing and then to block 210 for differentially encoded quadrature phase shift keying (DEQPSK) demodulation, as known in the art. Rate 3 and 4 data 212, which, according to the 802.11b standard, is CCK data, requires equalization and so may be passed to decision feedback equalizer 214 after front-end processing at module 204. After processing by decision feedback equalizer 214, the CCK encoded rate 3 and 4 data 212 may be passed to demodulator 216 for CCK DEQPSK demodulation.

Equalizer 214 may be a decision feedback equalizer, according to one embodiment, incorporating two finite impulse response (FIR) filters, one a feedforward filter (FFF) and the other a feedback filter (FBF). The decision feedback equalizer may be used, for example, to suppress intersymbol interference (ISI) caused by dispersive propagation channels. The feedforward filter may operate on the data 212 and the feedback filter may operate on previously detected data symbols.

In operation, decision feedback equalizer 214 may decode every 8 (as an example) soft estimated chips at a junction of the feedforward filter and feedback filter (i.e., combined output of FFF+FBF) into detected data bits—i.e., having the form of the original data as transmitted in a data transmission—such as a data transmission in wireless LAN 100—and re-encode the detected data bits into an 8 element CCK code-word (i.e., complex constellation). Decision feedback equalizer 214 may then replace the top of the FBF input vector X with the re-encoded CCK code-word, i.e., restack the input vector X; and may do this restacking of X periodically.

For 802.11b communications, CCK coding of the original data bits is specified by the 802.11b standard and depends on the rate of data transmission. Rate 3 data, i.e., data transmitted at 5.5 million bits per second (Mbits/s), is transmitted at 4 bits per symbol, while rate 4 data, i.e., data transmitted at 11 Mbits/s, is transmitted at 8 bits per symbol. Data is transmitted at either rate 3 or 4 by encoding the data bits –4 or 8 at a time—into an 8 chip CCK code-word. Thus, 16 code words suffice for rate 3 data, and 256 code words suffice for rate 4 data. The coding is accomplished according to the 802.11b standard using a combination of differential quadrature phase shift keying (DQPSK) and quadrature phase shift keying (QPSK) with CCK encoding. For example, for rate 3 data transmissions, the 4-bit coding uses tables 108 and 109 of section 18.4.6.5.2 of IEEE Std 802.11b-1999—referred to above and incorporated herein by reference—and for rate 4 data transmissions, the 8-bit coding uses tables 108 and 110 of section 18.4.6.5.3, and formula (I) of section 18.4.6.5 of IEEE Std 802.11b-1999. Each CCK code-word has 8 chips, for example, where a chip may be considered to be a complex number having one of the four values +1, –1, +j, or –j. Each CCK code-word represents either 4 bits of rate 3 data or 8 bits of rate 4 data, as specified by the 802.11b standard.

Thus, at the receiver, data may be detected, i.e., recovered into bits having the form of the original data, by using the stream of chips received, i.e., rate 3 and rate 4 data 212, to estimate which of 16 code-words (rate 3) or 256 code-words (rate 4) has been transmitted and then determining the 4 bits (rate 3) or 8 bits (rate 4) of transmitted data from the code-word. Data detection may be implemented, for example, using chip matched filter detection with maximum likelihood estimation, or minimum mean square error estimation.

Although CCK coding according to the 802.11b standard is used to illustrate embodiments of the present invention, the present invention may also be applicable to other standards or forms of data transmission using CCK data encoding.

Figure 3A:
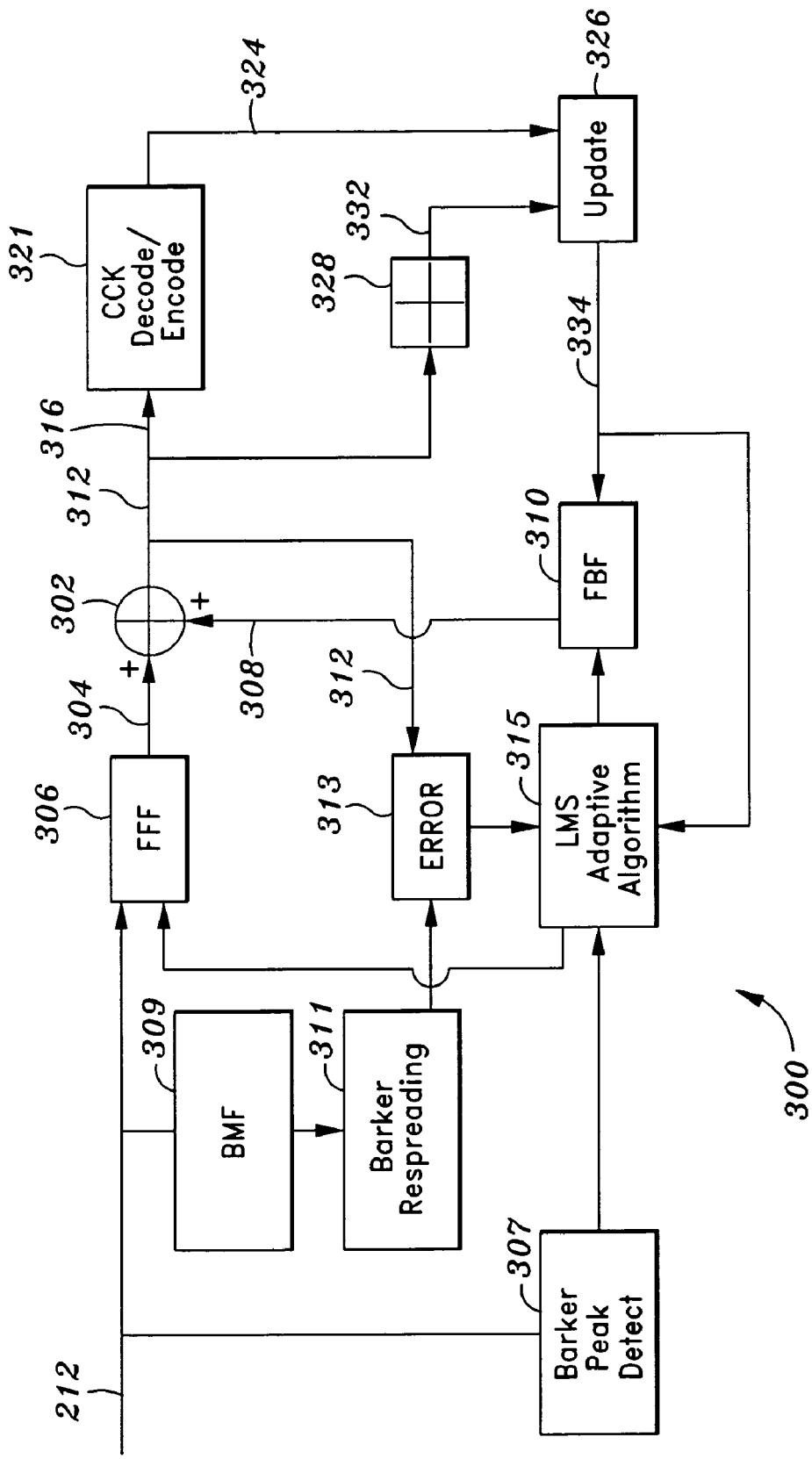
FIG. 3A is a block diagram of an exemplary decision feedback equalizer according to one embodiment of the present invention.

Referring now to FIG. 3A, an exemplary decision feedback equalizer 300 according to one embodiment is illustrated. Decision feedback equalizer 300 may receive CCK data—such as data 212—from a receiver front end processing module—such as front end processing module 204. Data 212 may be passed to feedforward filter 306, Barker peak detect module 307, and Barker matched filter 309. Output of Barker matched filter 309 may be connected to Barker respreading module 311. Output of Barker respreading module 311 may be connected to error module 313. Error module 313 may also receive as input chip estimates 312. Module 315 may implement an adaptive algorithm which updates the coefficients of the FFF and FBF which may be a least mean square (LMS) algorithm. Module 315 may receive inputs from error module 313, Barker peak detection module 307, and update module 326. Module 315 may provide outputs to feedback filter 310 and feedforward filter 306, as seen in FIG. 3A. The implementation and functioning of Barker peak detection module 307, Barker matched filter 309, Barker respreading module 311, error module 313, and module 315 are generally known in the art.

Figure 3B:
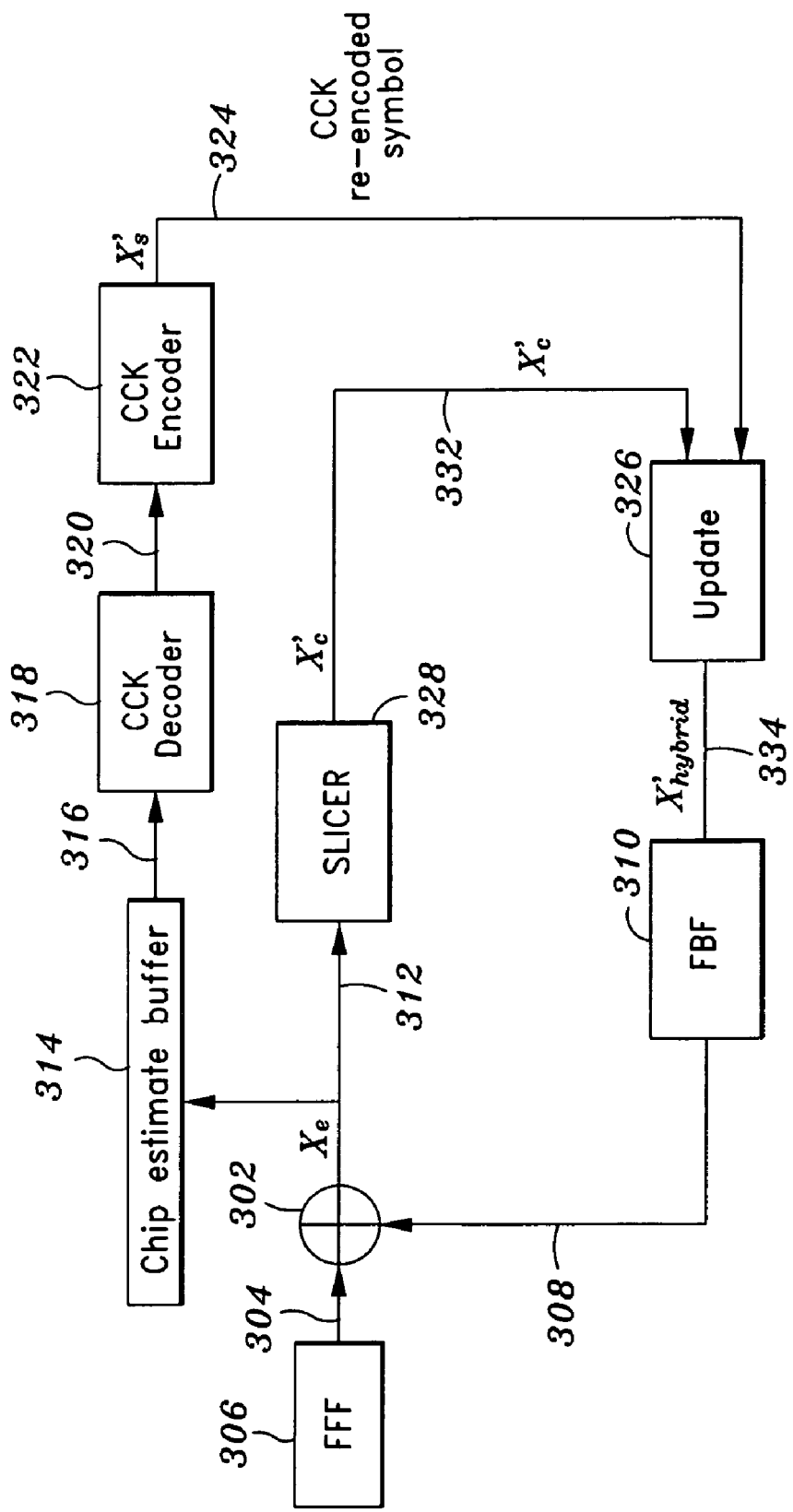
FIG. 3B is a block diagram of an exemplary subsystem of a decision feedback equalizer according to one embodiment of the present invention.

Summer 302 may be used, as more fully described below, to provide a chip estimate vector 316 to a CCK decode/encode module 321. CCK decode/encode module 321 may be implemented, for example, using CCK decoder 318 and CCK encoder 322, as shown in FIG. 3B, and as described below. CCK decode/encode module 321, chip slicer 328, and update module 326 may be used to provide input vector 334 reflecting the CCK coding gain to feedback filter 310, as described below and as shown in FIG. 3B.

Referring now to FIG. 3B, a subsystem 350 of exemplary decision feedback equalizer 300 according to one embodiment is illustrated. Subsystem 350 of decision feedback equalizer 300 may include the summer 302 for combining an output 304 of a feedforward filter 306 with an output 308 of a feedback filter 310. The implementation and functioning of feedforward filters and feedback filters in decision feedback equalizers are known in the art. For example, feedforward filter 306 may receive CCK data—such as data 212—from a receiver front end processing module—such as front end processing module 204. Output 304 of feedforward filter 306 may have the form of a chip estimate, for example, one of the 8 chips of a CCK code-word. Likewise, output 308 of feedback filter 310 may have the form of a chip estimate, for example, one of the 8 chips of a CCK code-word. Both output 304 and output 308 may be considered to be a complex number. Summer 302 combines output 304 and output 308, for example, by addition of complex numbers, to produce an estimated chip, i.e., chip estimate 312, which may be denoted as $x_e(i)$ and which also may be considered to be a complex number.

Chip estimate 312 may be passed to chip estimate buffer 314. Chip estimate buffer 314 may collect a sequence of chip estimates 312 into a sequence. For example, 8 chip estimates 312 at a time may be collected to form estimate vector 316, which may be denoted as $X_e=[x_e(1), x_e(2), \ldots, x_e(8)]$. Thus, estimate vector 316, $X_e$, may have 8 chips, similar to a CCK code-word.

Estimate vector 316 may be passed to a CCK decoder 318. CCK decoder 318 may decode estimate vector 316 to detect a sequence of bits of original data 320. For example, according to the 802.11b standard, 4 bits of data 320 may be detected at rate 3, or 8 bits of data 320 may be detected at rate 4. For example, CCK decoder 318 may be implemented, as known in the art, using chip matched filter detection with maximum likelihood estimation, or minimum mean square error estimation.

Data 320 may be passed to CCK encoder 322. CCK encoder 322 may encode data 320, for example, according to the 802.11b standard, into CCK re-encoded symbol 324, which may be denoted as $X_s'=[x_s'(1), x_s'(2), \ldots, x_s'(8)]$. CCK re-encoded symbol 324 may be considered as an estimate vector 316 re-encoded into a valid CCK code-word. The $x_s'(1), x_s'(2), \ldots, x_s'(8)$ may be referred to as the chips of the code-word or re-encoded symbol 324, which may be a vector of length 8. Because CCK re-encoded symbol 324 is a valid CCK code-word, the CCK re-encoded symbol 324 reflects the CCK coding gain, as described above. CCK re-encoded symbol 324 may be passed to update module 326.

Chip estimate 312 also may be passed to chip slicer 328. Chip estimate 312, which may be considered to be a complex number, may be converted by chip slicer 328, as known in the art, into a direct sliced chip 332, which may be denoted as $x_c'(i)$, and having, for example, one of the complex number values +1, −1, +j, or −j. Direct sliced chip 332 may be passed to update module 326.

Update module 326 may receive CCK re-encoded symbol 324, which may be denoted as $X_s'=[x_s'(1), x_s'(2), \ldots, x_s'(8)]$, concurrently with a sequence of direct sliced chips 332, which may be denoted as $[x_c'(1), x_c'(2), \ldots, x_c'(M)]$ where M, for example, may be the length of an input vector required by feedback filter 310. Update module 326 may form a hybrid vector of length M for input to feedback filter 310, referred to as input vector 334, which may be denoted as $X'_{hybrid}$, by replacing the top, i.e., the first 8 chips, of the vector $[x_c'(1), x_c'(2), \ldots, x_c'(M)]$ of direct sliced chips with the chips of CCK re-encoded symbol 324, i.e., CCK code-word $[x_s'(1), x_s'(2), \ldots, x_s'(8)]$.

For example, if M>8, i.e., the length of the hybrid or input vector 334 is greater than the length of the CCK code-word, then input vector 334 may be formed as $X'_{hybrid}=[x_s'(1), x_s'(2), \ldots, x_s'(8), x_c'(9), \ldots, x_c'(M)]$.

Also, for example, if M=8, i.e., the length of the hybrid or input vector 334 is equal to the length of the CCK code-word, then input vector 334 may be formed as $X'_{hybrid}=[x_s'(1), x_s'(2), \ldots, x_s'(8)]$.

Further, for example, if M<8, i.e., the length of the hybrid or input vector 334 is less than the length of the CCK code-word, then input vector 334 may be formed as $X'_{hybrid}=[x_s'(1), \ldots, x_s'(M)]$. In terms of timing or chip rates, for example, update module 326 may replace direct sliced chips of the feedback filter input vector 334 with CCK code word chips at a rate of one-eighth the direct sliced chip rate.

By providing CCK re-encoded chips at the input of feedback filter 310, the error rate of output 308 of feedback filter 310 may be reduced as a result of the CCK coding gain of the replaced chips over sequences of individually direct sliced chips, thereby improving overall performance of decision feedback equalizer 300 and CCK demodulation.

Figure 4:
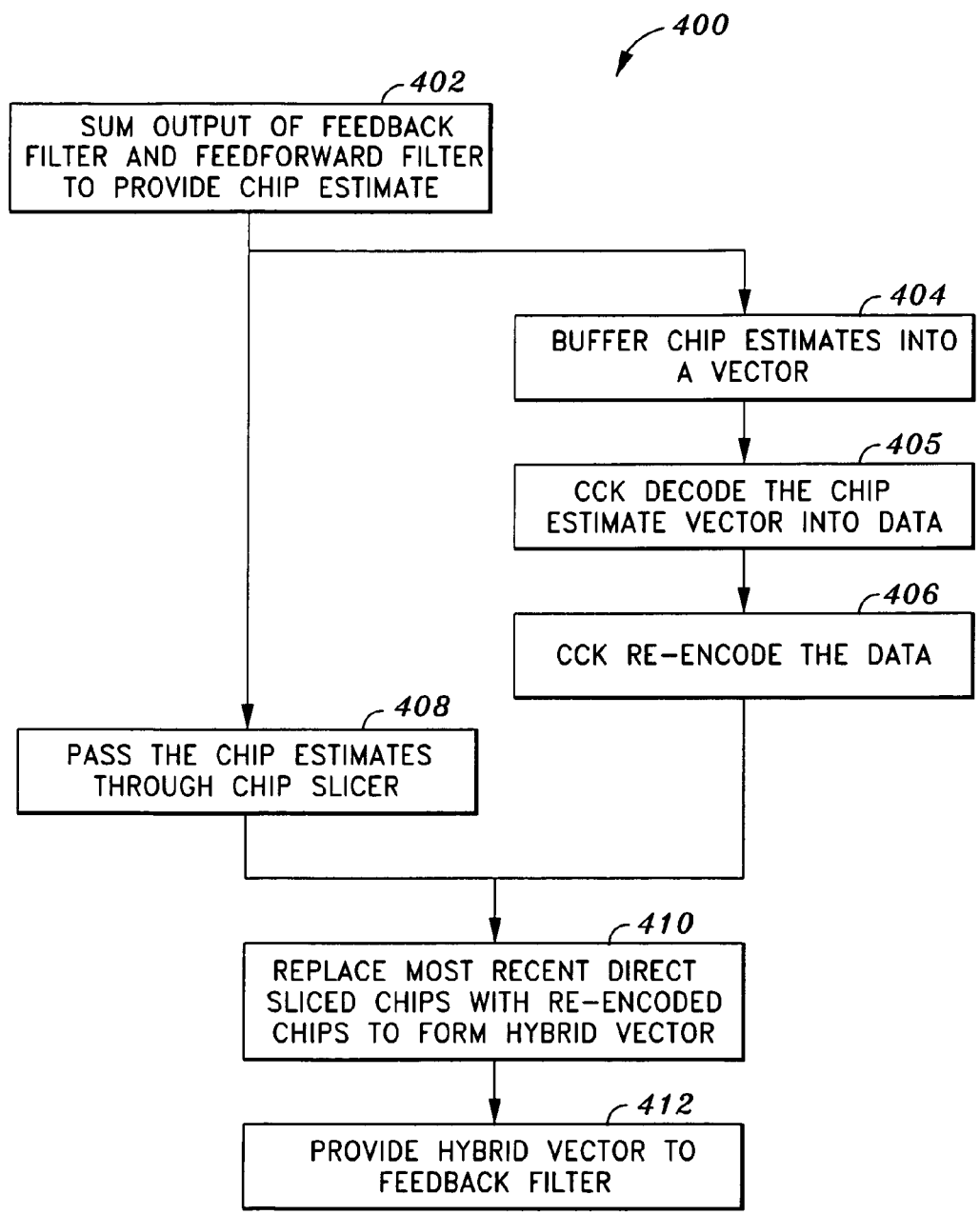
FIG. 4 is a flow chart illustrating one example of a method for decision feedback equalization for a wireless communication device, such as those shown in FIG. 1, in accordance with one embodiment of the present invention.

Referring now to FIG. 4, an exemplary embodiment of a method 400 for decision feedback equalization for a wireless communication device, such as receiver 200 shown in FIG. 2, is illustrated. Method 400 may be implemented, for example, in hardware of decision feedback equalizer 214 of receiver 200. Method 400 may also be implemented, for example, in software loaded in a memory in receiver 200.

Exemplary method 400 may include steps 402, 404, 405, 406, 408, 410, and 412, which conceptually delineate method 400 for purposes of conveniently illustrating method 400 according to one embodiment. Exemplary method 400 is illustrated with reference to decision feedback equalization for an exemplary wireless communication device including decision feedback equalizer 300 shown in FIG. 3A and subsystem 350, shown in FIG. 3B, of decision feedback equalizer 300.

Method 400 may begin with step 402, in which an output of a feedback filter may be summed with an output of a feedforward filter to provide chips, referred to as chip estimates, for example, chip estimates 312.

Method 400 may continue at step 404, in which the chip estimates 312 from step 402 are buffered. For example, chip estimates 312 may be collected in a group of 8 to form an 8-chip vector of estimated chips, such as estimate vector 316.

Method 400 may continue at step 405, in which the vector of estimated chips—such as estimate vector 316—is CCK decoded into data. For example, estimate vector 316 may first be decoded using CCK decoder 318 into data 320.

Method 400 may then continue at step 406, in which the data—such as data 320—is re-encoded into a CCK code-word. For example, data 320 may be CCK re-encoded using CCK encoder 322 to provide a CCK re-encoded symbol 324, i.e., a valid CCK code-word.

Method 400 may also comprise step 408, in which the chip estimates from step 402 are passed through a chip slicer. For example, chip estimates 312 may be passed through a chip slicer to provide direct sliced chips 332 with values of +1, −1, +j, or j.

Method 400 may continue at step 410, in which a hybrid vector is formed by replacing the top of the most recent direct sliced chips, i.e., the first 8 chips, of the vector $[x_c'(1), x_c'(2), \ldots, x_c'(M)]$ of direct sliced chips with the CCK re-encoded chips, i.e., CCK code-word $[x_s'(1), x_s'(2), \ldots, x_s'(8)]$. For example, hybrid input vector 334 may be formed from direct sliced chips 332 and CCK re-encoded symbol 324 according to the following example. If M>8, i.e., the length of the hybrid or input vector 334 is greater than the length of the CCK code-word, then input vector 334 may be formed as $X'_{hybrid} = [x_s'(1), x_s'(2), \ldots, x_s'(8), x_c'(9), \ldots, x_c'(M)]$. If M=8, i.e., the length of the hybrid or input vector 334 is equal to the length of the CCK code-word, then input vector 334 may be formed as $X'_{hybrid} = [x_s'(1), x_s'(2), \ldots, x_s'(8)]$. If M<8, i.e., the length of the hybrid or input vector 334 is less than the length of the CCK code-word, then input vector 334 may be formed as $X'_{hybrid} = [x_s'(1), \ldots, x_s'(M)]$.

Method 400 may continue at step 412, by providing the hybrid vector from step 410 to an input of a feedback filter—such as feedback filter 310—of a decision feedback equalizer—such as decision feedback equalizer 300.

We claim:

1. A decision feedback equalizer, comprising:
    a complementary code keying (CCK) decoder that decodes a vector of chip estimates formed from a plurality of chip estimates;
    a CCK encoder connected with said CCK decoder, wherein said CCK encoder re-encodes said decoded vector of chip estimates into a valid CCK code word;
    a chip slicer that provides direct sliced chips from said plurality of chip estimates;
    an update module that forms a hybrid vector from said valid CCK code-word and said direct sliced chips
    chips of said valid CCK code-word followed by said direct sliced chips, when a length of said hybrid vector is greater than a length of said valid CCK code-word;
    chips of said valid CCK code-word, when said length of said hybrid vector equals said length of said valid CCK code-word; and
    chips of said valid CCK code-word up to said length of said hybrid vector, when said length of said hybrid vector is less than said length of said valid CCK code-word.

2. A decision feedback equalizer, comprising:
    a complementary code keying (CCK) decoder that decodes a vector of chip estimates formed from a plurality of chip estimates;
    a CCK encoder connected with said CCK decoder, wherein said CCK encoder re-encodes said decoded vector of chip estimates into a valid CCK code word;
    a chip slicer that provides direct sliced chips from said plurality of chip estimates;
    an update module that forms a hybrid vector from said valid CCK code-word and said direct sliced chips; and
    a feedback filter wherein said hybrid vector has a length matching an input vector length of said feedback filter and said hybrid vector is an input vector to said feedback filter.

3. The decision feedback equalizer of claim 2, further comprising:
    a feedforward filter having a feedforward filter output;
    a feedback filter having a feedback filter output, and receiving said hybrid vector as input;
    a sum module that receives said feedforward filter output and said feedback filter output, and produces a chip estimate of said plurality of chip estimates.

4. The decision feedback equalizer of claim 2, wherein said CCK encoder re-encodes said vector of chip estimates in accordance with an 802.11b standard.

5. A decision feedback equalizer, comprising:
    a sum module that receives a feedforward filter output and a feedback filter output, and produces a chip estimate of a plurality of chip estimates;
    a chip estimate buffer that forms said plurality of chip estimates into a vector of chip estimates;
    a complementary code keying (CCK) decoder that decodes said vector of chip estimates;
    a CCK encoder connected with said CCK decoder, wherein said CCK encoder re-encodes said decoded vector of chip estimates into a valid CCK code word;
    a chip slicer that provides a sequence of direct sliced chips from said plurality of chip estimates;
    an update module that forms a hybrid vector from said valid CCK code-word and said sequence of direct sliced chips, and provides said hybrid vector as an input vector to said feedback filter
    said valid CCK code-word has a form $[x_s'(1), x_s'(2), \ldots, x_s'(8)]$;
    said sequence of direct sliced chips has a form $[x_c'(1), x_c'(2), \ldots, x_c'(M)]$ wherein said input vector has a length M;
    said update module forms said hybrid vector as $[x_s'(1), x_s'(2), \ldots, x_s'(8), x_c'(9), \ldots, x_c'(M)]$ when M>8;
    said update module forms said hybrid vector as $[x_s'(1), x_s'(2), \ldots, x_s'(8)]$ when M=8; and
    said update module forms said hybrid vector as $[x_s'(1), \ldots, x_s'(M)]$ when M<8.

6. The decision feedback equalizer of claim 5, wherein said valid CCK code-word is in accordance with an 802.11b standard.

7. A decision feedback equalizer, comprising:
    means for decoding a vector of chip estimates formed from a plurality of chip estimates;
    means for re-encoding said decoded vector of chip estimates into a complementary code keying (CCK) code-word;
    means for slicing a chip of said plurality of chip estimates to provide a sequence of direct sliced chips; and
    means for forming a hybrid vector from said CCK code-word and said sequence of direct sliced chips
    means for forming said hybrid vector as chips of said CCK code-word followed in sequence by chips of said sequence of direct sliced chips, when a length of said hybrid vector is greater than a length of said CCK code-word;
    means for forming said hybrid vector as chips of said CCK code-word, when said length of said hybrid vector equals said length of said CCK code-word; and
    means for forming said hybrid vector as chips of said CCK code-word up to said length of said hybrid vector, when said length of said hybrid vector is less than said length of said CCK code-word.

8. The decision feedback equalizer of claim 7, wherein said means for re-encoding said vector of chip estimates into a CCK code-word is in accordance with an 802.11b standard.

9. A method for decision feedback equalization, comprising steps of:
- decoding a vector of chip estimates formed from a plurality of chip estimates;
- re-encoding said decoded vector of chip estimates into a complementary code keying (CCK) code-word;
- slicing a chip of said plurality of chip estimates to provide a sequence of direct sliced chips;
- forming a hybrid vector from said CCK code-word and said sequence of direct sliced chips,
- forming said hybrid vector as chips of said CCK code-word followed in sequence by chips of said sequence of direct sliced chips, when a length of said hybrid vector is greater than a length of said CCK code-word;
- forming said hybrid vector as chips of said CCK code-word, when said length of said hybrid vector equals said length of said CCK code-word; and
- forming said hybrid vector as chips of said CCK code-word up to said length of said hybrid vector, when said length of said hybrid vector is less than said length of said CCK code-word.

10. The method of claim 9, wherein:
said CCK code-word has a length of 8;
said CCK code-word has a form $[x_s'(1), x_s'(2), \ldots, x_s'(8)]$;
said sequence of direct sliced chips has a form $[x_c'(1), x_c'(2), \ldots, x_c'(M)]$ wherein said hybrid vector has a length M; and wherein
said step of forming said hybrid vector includes:
- forming said hybrid vector as $[x_s'(1), x_s'(2), \ldots, x_s'(8), x_c'(9), \ldots, x_c'(M)]$ when M>8;
- forming said hybrid vector as $[x_s'(1), x_s'(2), \ldots, x_s'(8)]$ when M=8; and
- forming said hybrid vector as $[x_s'(1), \ldots, x_s'(M)]$ when M<8.

11. The method of claim 9, further comprising a step of:
summing a feedforward filter output and a feedback filter output to produce a chip estimate of said plurality of chip estimates.

12. The method of claim 9, wherein said step of re-encoding said vector of chip estimates into a CCK code-word is in accordance with an 802.11b standard.

* * * * *